C. F. RUDOLF.
COMBINED INVENTORY TICKET AND STOCK SHEET.
APPLICATION FILED FEB. 12, 1912.

1,114,811.                                      Patented Oct. 27, 1914.

UNITED STATES PATENT OFFICE.

CLINTON F. RUDOLF, OF CHICAGO, ILLINOIS.

COMBINED INVENTORY-TICKET AND STOCK-SHEET.

1,114,811.  Specification of Letters Patent.   Patented Oct. 27, 1914.

Application filed February 12, 1912. Serial No. 677,185.

*To all whom it may concern:*

Be it known that I, CLINTON F. RUDOLF, a citizen of the United States, residing at Chicago, in the county of Cook and State of Illinois, have invented certain new and useful Improvements in Combined Inventory-Tickets and Stock-Sheets, of which the following is a specification.

My invention relates in general to the means employed by merchants and others in taking inventory of stock, and its object is, broadly, to provide a combined inventory ticket and stock sheet by the use of which a considerable part of the work of taking an inventory will be eliminated, and many of the errors common thereto avoided.

It has been the custom in taking an inventory heretofore, particularly in large stores selling a great variety of articles to send to each department tickets upon which the clerks enter the quantity of goods of specific description on hand, and such other information as may be desired. These tickets are then collected and taken to the office where the entries thereon are read off by one clerk to another and entered in the stock-books or on loose stock-leaves. The value of the total number of each article is then extended, and the page or sheet is totaled. With this commonly employed system many opportunities for mistakes have been present both in the transfer from the tickets to the stock-books and in the computations.

A principal object of my invention is to provide a combined inventory ticket and stock sheet adapted to contain all the information desired in connection with the taking of the inventory in a convenient form and arrangement, and by the use of which many of the opportunities for error will be eliminated.

A further object of my invention is to provide a combined inventory ticket and stock sheet which will require in connection with its use no transfer of the entries thereon to stock-books or leaves, and which may itself be filed as a permanent record.

Additional objects and advantages of my invention will be apparent as it is better understood from the following description, which taken in connection with the accompanying drawing illustrates one preferred embodiment thereof.

The drawing represents a combined inventory ticket and stock sheet made in pursuance of my invention.

The said ticket or sheet is composed of the larger and main recording portion 1, to which is secured in any detachable manner, preferably by a series of perforations 2 extending the length of the sheet, a checking stub 3, adapted to receive the total value of the article inventoried on the main portion of the sheet as will be hereinafter disclosed. Both the recording portion and the stub are provided with an aperture 4 adjacent their top to permit them to be filed in suitable looseleaf-books or filing boxes to form a permanent record. Near the top of the said main recording portion and stub and beneath the said apertures, printed or stamped thereon, are suitable heading adjacent which space is left to receive the date, the department of the establishment using the ticket and the number of the ticket as at 5, 6 and 7. Upon the main portion, beneath the said date, department and ticket headings is preferably located an order 8 to the employees not to destroy a ticket, and directing them to account for every one, although this may obviously be omitted, it being manifestly desirable, if such directions be used, that they be placed in a prominent position where they may be seen and read before the inventory has started. Beneath this order I have located a space and a heading 9 therefor for receiving the name of the article to be inventoried upon the said ticket.

To prevent confusion of the units in which the article is sold and inventoried, I have provided a plurality of spaces 10, a space corresponding to each unit of sale that may be employed throughout the said store, and have labeled each of the said spaces in such manner that a cross or check disposed in one of them will indicate the sale unit of the said article. Beneath these spaces are preferably provided directions 11 for their use, and beneath the said directions I have located a plurality of vertical columns 12 for receiving a record of the sales of any number of the article after a count has been made and entered up in the space provided for this purpose and which will be hereinafter described, adding preferably an order 13, directing that such entries be made in these spaces.

Adjacent the bottom of the main portion 1 of the sheet are a plurality of columns divided into spaces with appropriate headings for receiving entries in connection with the inventory, and these spaces are preferably arranged in the manner shown. At each side of the said main portion 1 are spaces 14 and 14' properly labeled for receiving the total value represented by the quantity of articles on hand when the inventory has been completed. The space 14 is employed to receive the total value when computed on a basis of the unit cost of the said article, and the space 14' is employed to receive the total value when computed on a basis of the price at which the unit sells. It will be manifest, however, that either or both of such spaces may be used without departing from the spirit or scope of my invention. Even when the inventory is computed on the cost price it is sometimes desirable to compute the total selling price in the space 14' for comparison or other purposes. Between these spaces 14 and 14' I preferably provide a space 15 to receive the code cost, wherein may be written the code symbol should the goods be provided therewith, a space 16 to receive the original cost, and a space 17 to receive the actual present value of a unit of the articles. These are preferably located in a column one above the other adjacent the summation space 14, it being obvious, however, that where desired such spaces may be omitted entirely from the ticket. Beneath the spaces, 15, 16 and 17, and at the bottom of the said column I have provided a space 18 properly headed for receiving the unit value at which the articles are inventoried.

Adjacent the column comprising the spaces 15, 16, 17 and 18 I provide a second column of spaces preferably comprising a space 19, to receive the signature of the clerk determining the quantity of the article on hand and the space 20 immediately therebelow to receive the signature of the clerk checking the said quantity. In the said column is also provided a space 21 for receiving a number indicating the lot to which the goods belong. Beneath these spaces I have provided a space 22 wherein may be written the quantity of the article on hand when the inventory was commenced, expressed in the indicated unit, and the quantity, expressed in the same unit, disposed of thereafter and before the ticket is turned into the office. Beneath the space 22 and adjacent the space 18, is a space 23 to receive the net quantity of goods on hand when the ticket is turned in, which is the difference between the numbers placed immediately thereabove in space 22, as hereinabove described. Between this column and the summation space 14' are disposed two spaces 24 and 25, the space 24 to receive the price at which a unit of the said article sells, and the space 25 to receive the name of the person extending or computing in space 14' the total value of the articles inventoried. Thus the net quantity of goods in stock and the inventory price based on the cost arranged side by side for convenience in computing the total inventory cost.

Upon the stub 3 and adjacent the bottom thereof and in line with the summation space 14 and the net quantity and inventory rate spaces 23 and 18 is located a third summation space 26 wherein may be placed the total inventory value of the net quantity of articles on hand, and above this space is located a space 27 to receive the signature of the person performing this computation.

When an inventory of a department store, for example, is to be taken on a certain date with my combined ticket and stock sheet, a sufficient number of tickets serially numbered are distributed to the clerks in the various departments. The tickets are thus numbered to avoid duplication and to facilitate handling. The department number and date on which the inventory is taken may be filled in before or after the tickets are delivered to the department. A clerk in the department writes on the ticket the name of the article to be counted and places a check in the space indicating the proper unit, i. e., if the goods sell or are inventoried by the yard, the said clerk will put a cross within the space above which is printed the word "yard," or if the goods are inventoried by the gross, the cross will be placed in the space immediately beneath the word "gross." The number of units of the article is counted, and the result written in the upper part of the space 22 beneath the heading "Original quantity," the counter writing his name in the space 19. The count is then checked by another clerk, and if found to be correct the checker writes his name in the space 20. The count must thus be satisfactory to two persons whose signatures appear in the said spaces. A clerk thereupon makes the proper entries in the spaces 15, 16, 17 and 18, or as many of the said spaces as the data disposed upon the tickets attached to the goods permit, and also inserts the selling price in the space 19. The entries in these spaces 15, 16, 17, 18 and 19, or any of them, may be made by the clerks in the department where the goods are located, or in the office, or by clerks specially delegated for that work.

In a large store, or even in a large department, it is practically impossible to count all the goods in one day, and hence the tickets are distributed several days before the date on which the inventory is taken, and provision is made for recording sales after the goods are counted and before the tickets are turned in. For this purpose the spaces 12 have been provided to receive a record of the sales of the article after the original count is made and before the net quantity on hand is entered. As each such sale is made, the quantity sold or used is entered in the columns 12, and just before the ticket is turned in the total of such sales is computed and entered in the space 22 and subtracted from the original number of units of the article already entered in space 22, the result being set down in the space 23 as the net quantity of the article to be inventoried. The inventory may then be extended by the clerk making out the ticket, or by some other clerk, by multiplying the net quantity in stock as thus set forth in the space 23 by the inventory price as set forth in the space 18, writing down the result of such multiplication in the space 26 on the stub and signing his name in the space 27. I prefer to have the first extension made on the stub so that it can be separated from the main portion, and then a second extension is made by another clerk upon the main portion, the result being entered in the space 14 with the signature of the person making the extension in the space 25. Thus I provide for two independent extensions, and when the computation of the extensions on the stubs on the main portions of all the tickets is made, they should agree. This gives a check on the final result which is easily made, and if the totals do not agree the error can be readily discovered by comparing the stubs and main portions, and when the ticket is found showing the variance the mistake can be corrected after making a new extension.

It will thus be obvious that should any mistake occur in the computations it can be easily remedied by comparing the stubs with their corresponding recording main portions, and the responsibility therefore fastened upon the proper individual.

If the inventory is computed from the selling price, the extensions will be similarly made from the entries in spaces 24 and 14', and the same course pursued as before described, or this extension and computation may be made in addition to the other if desired.

It will be manifest also that where such a ticket is used there is no longer the need to transfer the quantity of the article or the various other items to a book or sheet intended to form a part of the permanent records because the main portion of the tickets constitute a complete and also an original record of all the details of the inventory, and can be bound together or filed in accordance with a looseleaf system. The elimination of this transfer removes a fruitful source of error and effects a material reduction in the labor ordinarily expended in taking an inventory. Where it is deemed advisable the stub also may be filed in like manner for subsequent verification or to disclose merely the aggregate value of the articles inventoried on the main sheets.

It will be apparent that variations in the number of spaces and their arrangement may be employed without departing from the spirit or scope of my invention, or sacrificing any of its advantages, the form hereinbefore disclosed being merely one preferred embodiment thereof.

I claim:—

1. A combined inventory ticket and stock sheet comprising a record portion provided with spaces and headings therefor for receiving information relating to the article being inventoried, spaces and headings therefor for receiving the unit in which the said article is inventoried, a column and means designating the same for receiving the number of units disposed of after the said count is made and before the inventory is completed, a space and heading therefor for receiving the number of units of the article on hand when the count is made and the total number of units of the article disposed of after said count is made and before the inventory is completed, a space and heading therefor for receiving the number of units on hand when the inventory is completed, a space and heading therefor for receiving the unitary value at which the article is inventoried, and a space and heading therefor for receiving the summation value of the units of the article in stock when the inventory is completed.

2. A combined inventory ticket and stock sheet comprising a record portion provided with spaces and headings therefor for receiving information relating to the article being inventoried, spaces and headings therefor for receiving the unit in which the said article is inventoried, a space and heading therefor for receiving the number of units of the article on hand when the count is made and the total number of the article disposed of after said count is made and before the inventory is completed, a column and means designating the same for receiving the number of units disposed of after the said count is made and before the inventory is completed, a space and heading therefor for receiving the number of units on hand when the inventory is completed, a space and heading therefor for receiving the unitary value at which the article is inventoried, and a detachable stub, both said stub and said main portion being provided with identifying means and with a space and a heading therefor for receiving the summation value of the number of units of the article in stock when the inventory is completed.

3. A combined inventory ticket and stock sheet comprising a record portion provided with spaces and headings therefor for receiving information relating to the article being inventoried, a series of spaces and headings therefor disposed across the sheet for indicating the unit in which the said article is inventoried, a series of columns and means designating the same for receiving the number of units of the article disposed of after the count has been made and before the inventory is completed, a space and heading therefor for receiving the number of units of the article on hand when the said count is made, and a series of spaces and headings therefor disposed in alinement adjacent the bottom of the said sheet, said spaces and headings comprising a space and a heading therefor for receiving the number of units of the articles on hand when the inventory is completed, a space and a heading therefor for receiving the unit valve at which the article is inventoried, and a space and heading therefor for receiving the summation value of the number of units in stock when the inventory is completed.

4. A combined inventory ticket and stock sheet comprising a main record portion and a detachable stub, said main record portion being provided with spaces and headings therefor for receiving information relating to the article being inventoried, spaces and headings therefor for receiving a mark indicating the unit in which the article is inventoried, and a series of spaces and headings therefor disposed in alinement adjacent the bottom of the said record portion, said series comprising a space and a heading therefor for receiving the number of units of the article on hand when the inventory is completed, a space and heading therefor for receiving the unit value at which the said article is inventoried, and a space and heading therefor for receiving the summation value of the articles in stock when the inventory is completed, and a space and heading therefor upon the said detachable stub for receiving the summation value of the number of units in stock when the inventory is completed, said space upon the stub being disposed in alinement with said series of spaces upon the said main portion.

5. A combined inventory ticket and stock sheet comprising a record portion provided with spaces designated for the entry of information relating to the article being inventoried, a series of spaces disposed across the sheet and each designated by a unit in which various articles are sold and inventoried and adapted to be checked to disclose the unit in which the particular article is inventoried, a column and means designating the same for receiving the number of units disposed of after the count of the article has been made and before the inventory is completed, a space designated for the entry of units of the articles on hand when the count is made and for entry of the number of articles disposed of between the taking of the count and the completion of the inventory, one entry above the other, and a series of spaces arranged in alinement adjacent the bottom of the sheet and designated, one for receiving the number of units on hand at the completion of the inventory located directly beneath the space provided for the reception of the number of articles on hand when the count is made, a second designated for the entry of the unit value at which the article is inventoried and the third designated for the entry of the summation value of the number of units of the article in stock when the inventory is completed.

CLINTON F. RUDOLF.

Witnesses:
 WM. O. BELT,
 LUTHER JOHNS.